(12) United States Patent
Ohmori

(10) Patent No.: US 11,387,481 B2
(45) Date of Patent: Jul. 12, 2022

(54) FUEL CELL STACK AND METHOD OF PRODUCING FUEL CELL STACK

(71) Applicant: HONDA MOTOR CO., LTD., Tokyo (JP)

(72) Inventor: Suguru Ohmori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/847,710

(22) Filed: Apr. 14, 2020

(65) Prior Publication Data

US 2020/0335810 A1 Oct. 22, 2020

(30) Foreign Application Priority Data

Apr. 16, 2019 (JP) .............................. JP2019-077532

(51) Int. Cl.
*H01M 8/248* (2016.01)
*H01M 8/0273* (2016.01)
*H01M 8/0206* (2016.01)

(52) U.S. Cl.
CPC ......... *H01M 8/248* (2013.01); *H01M 8/0206* (2013.01); *H01M 8/0273* (2013.01)

(58) Field of Classification Search
None
See application file for complete search history.

(56) References Cited

U.S. PATENT DOCUMENTS

| 2008/0026279 | A1* | 1/2008 | Kobuchi | H01M 8/0258 429/514 |
| 2017/0229717 | A1* | 8/2017 | Luong | H01M 8/1007 |
| 2018/0212259 | A1* | 7/2018 | Yang | H01M 8/0284 |
| 2018/0226665 | A1* | 8/2018 | Oyama | H01M 8/0297 |
| 2018/0287181 | A1* | 10/2018 | Rock | H01M 8/0202 |
| 2019/0260041 | A1* | 8/2019 | Fay | H01M 8/0286 |

FOREIGN PATENT DOCUMENTS

| JP | 2017-139218 | 8/2017 |
| JP | 2018-129164 | 8/2018 |

OTHER PUBLICATIONS

Japanese Office Action for Japanese Patent Application No. 2019-077532 dated Mar. 22, 2022.

* cited by examiner

*Primary Examiner* — Alix E Eggerding
(74) *Attorney, Agent, or Firm* — Amin, Turocy & Watson, LLP

(57) ABSTRACT

In a fuel cell stack and a method of producing the fuel cell stack, a first thickness of a first rubber seal member in a stacking direction before a tightening load is applied to a stack body is set such that, when the tightening load is applied to the stack body, a first amount of deformation of the first rubber seal member in the stacking direction is larger than a second amount of deformation of a top part of a first seal bead in the stacking direction.

7 Claims, 8 Drawing Sheets

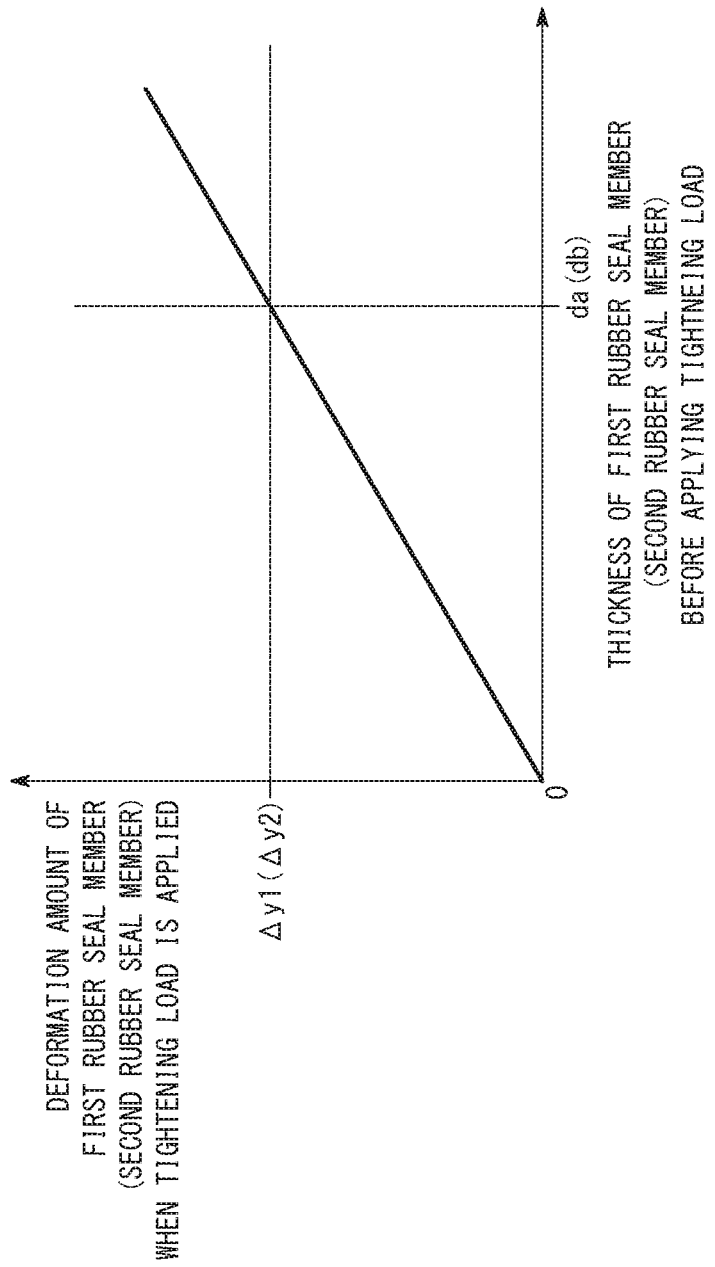

FUEL CELL STACK AND METHOD OF PRODUCING FUEL CELL STACK

CROSS-REFERENCE TO RELATED APPLICATION

This application is based upon and claims the benefit of priority from Japanese Patent Application No. 2019-077532 filed on Apr. 16, 2019, the contents of which are incorporated herein by reference.

BACKGROUND OF THE INVENTION

Field of the Invention

The present invention relates to a fuel cell stack including a stack body formed by stacking, in a stacking direction, a plurality of power generation cells each including a membrane electrode assembly and metal separators provided on both sides of the membrane electrode assembly, the membrane electrode assembly including an electrolyte membrane and electrodes provided on both sides of the electrolyte membrane. Further, the present invention relates to a method of producing the fuel cell stack.

Description of the Related Art

For example, Japanese Laid-Open Patent Publication No. 2017-139218 discloses a fuel cell stack having seal lines for preventing leakage of fluid (reactant gases and a coolant) from positions between a membrane electrode assembly and metal separators to the outside. The seal line includes a seal bead protruding from a surface of the metal separator on the side where the membrane electrode assembly is positioned, and resin material provided on the top part of the seal bead. A tightening load is applied to the stack body such that a predetermined surface pressure is applied to a seal surface of the resin material.

SUMMARY OF THE INVENTION

In this regard, when the tightening load is applied to the stack body, the top part of the seal bead is pressed in a direction opposite to the membrane electrode assembly, and deformed. In this case, it may not be possible to apply the sufficient surface pressure to the seal surface of the resin material, and it may not be possible to achieve the desired sealing performance of the seal line.

The present invention has been made in consideration of such issues, and an object of the present invention is to provide a fuel cell stack and a method of producing the fuel cell stack.

According to an aspect of the present invention, provided is a fuel cell stack comprising a stack body comprising a plurality of power generation cells stacked in a stacking direction, the power generation cells each including a membrane electrode assembly and metal separators provided on both sides of the membrane electrode assembly, the membrane electrode assembly including an electrolyte membrane and electrodes provided on both sides of the electrolyte membrane, a tightening load being applied to the stack body in the stacking direction of the stack body, and the metal separator being provided with a seal line configured to prevent leakage of fluid from a portion between the membrane electrode assembly and the metal separator to outside, wherein the seal line includes a seal bead protruding from a surface of the metal separator on a side where the membrane electrode assembly is positioned, and a rubber seal member interposed between a top part of the seal bead and a frame provided in an outer peripheral portion of the electrolyte membrane or provided along an outer periphery of the electrolyte membrane, and a thickness of the rubber seal member in the stacking direction before the tightening load is applied to the stack body is set such that, when the tightening load is applied to the stack body, an amount of deformation of the rubber seal member in the stacking direction is larger than an amount of deformation of the seal bead in the stacking direction.

According to another aspect of the present invention, provided is a method of producing a fuel cell stack comprising a stack body comprising a plurality of power generation cells stacked in a stacking direction, the power generation cells each including a membrane electrode assembly and metal separators provided on both sides of the membrane electrode assembly, the membrane electrode assembly including an electrolyte membrane and electrodes provided on both sides of the electrolyte membrane, the metal separator being provided with a seal line configured to prevent leakage of fluid from a portion between the membrane electrode assembly and the metal separator to outside, and the seal line including a seal bead protruding from a surface of the metal separator on a side where the membrane electrode assembly is positioned, and a rubber seal member interposed between a top part of the seal bead and a frame provided in an outer peripheral portion of the electrolyte membrane or provided along an outer periphery of the electrolyte membrane, the method comprising the steps of preparing the plurality of power generation cells, and applying a tightening load to the power generation cells in the stacking direction in a state where the plurality of power generation cells are stacked together, to deform the seal bead and the rubber seal member in the stacking direction, wherein a thickness, in the stacking direction, of the rubber seal member forming the power generation cell prepared in the preparing step is set such that, when the tightening step is performed, an amount of deformation of the rubber seal member in the stacking direction is larger than an amount of deformation of the seal bead in the stacking direction.

In the present invention, when the tightening load is applied to the stack body, the amount of deformation of the rubber seal member in the stacking direction becomes larger than the amount of deformation of the seal bead in the stacking direction. In the structure, when a tightening load is applied to the stack body, even if the top part of the seal bead is pressed in a direction opposite to the rubber seal member and deformed, deformation of the seal bead is compensated by deformation of the rubber seal member. Accordingly, it is possible to prevent formation of a gap on a seal surface of the rubber seal member. Therefore, it is possible to apply the sufficient surface pressure to the seal surface of the rubber seal member, and achieve the desired sealing performance of the seal line.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a graph showing the relationship between the thickness of and the amount of deformation of a first rubber seal member (second rubber seal member)

DESCRIPTION OF THE PREFERRED EMBODIMENTS

Hereinafter, preferred embodiments of a fuel cell stack and a method of producing the fuel cell stack according to the present invention will be described with reference to the accompanying drawings.

Figure 1:
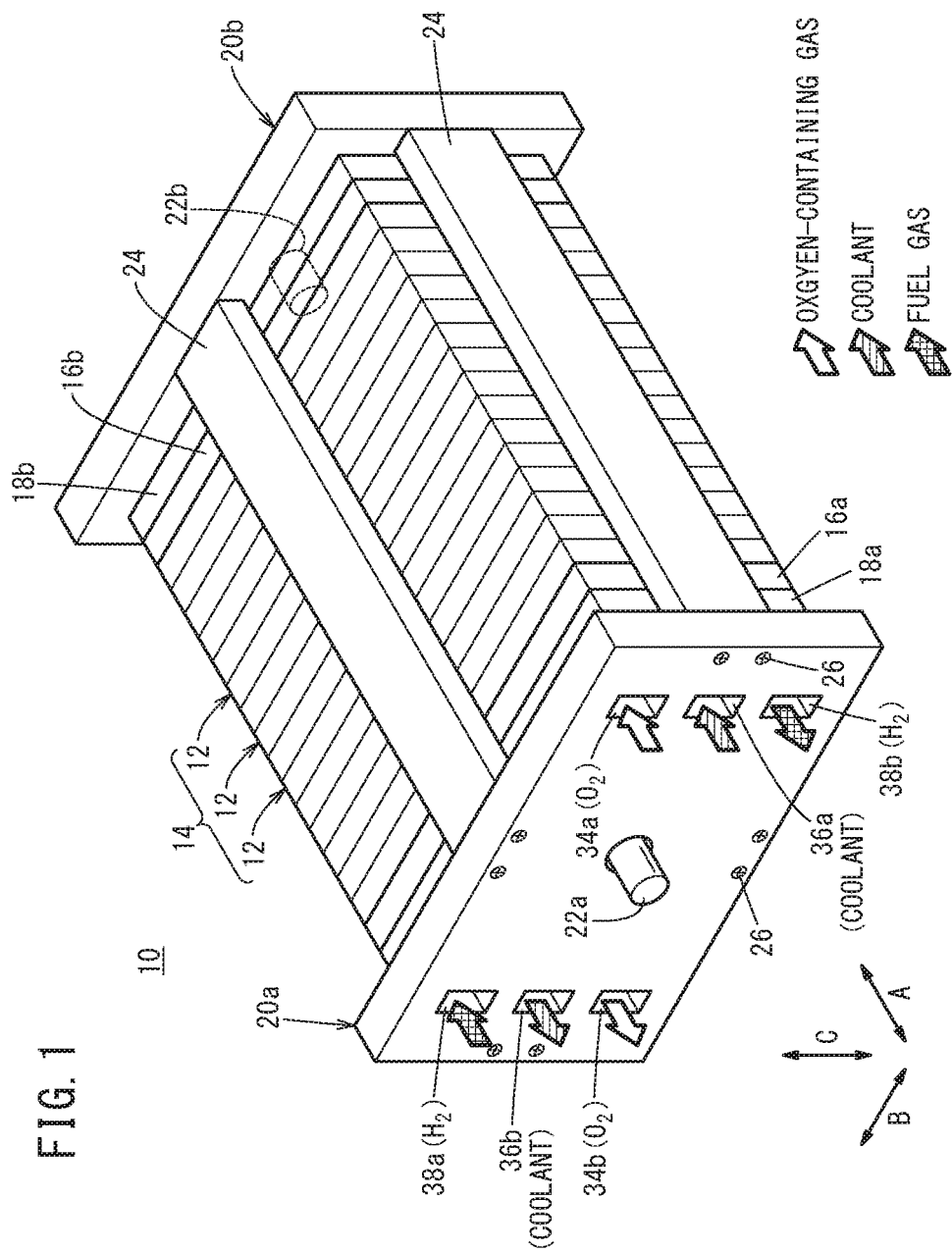
FIG. 1 is a perspective view showing a fuel cell stack according to an embodiment of the present invention.
Figure 2:
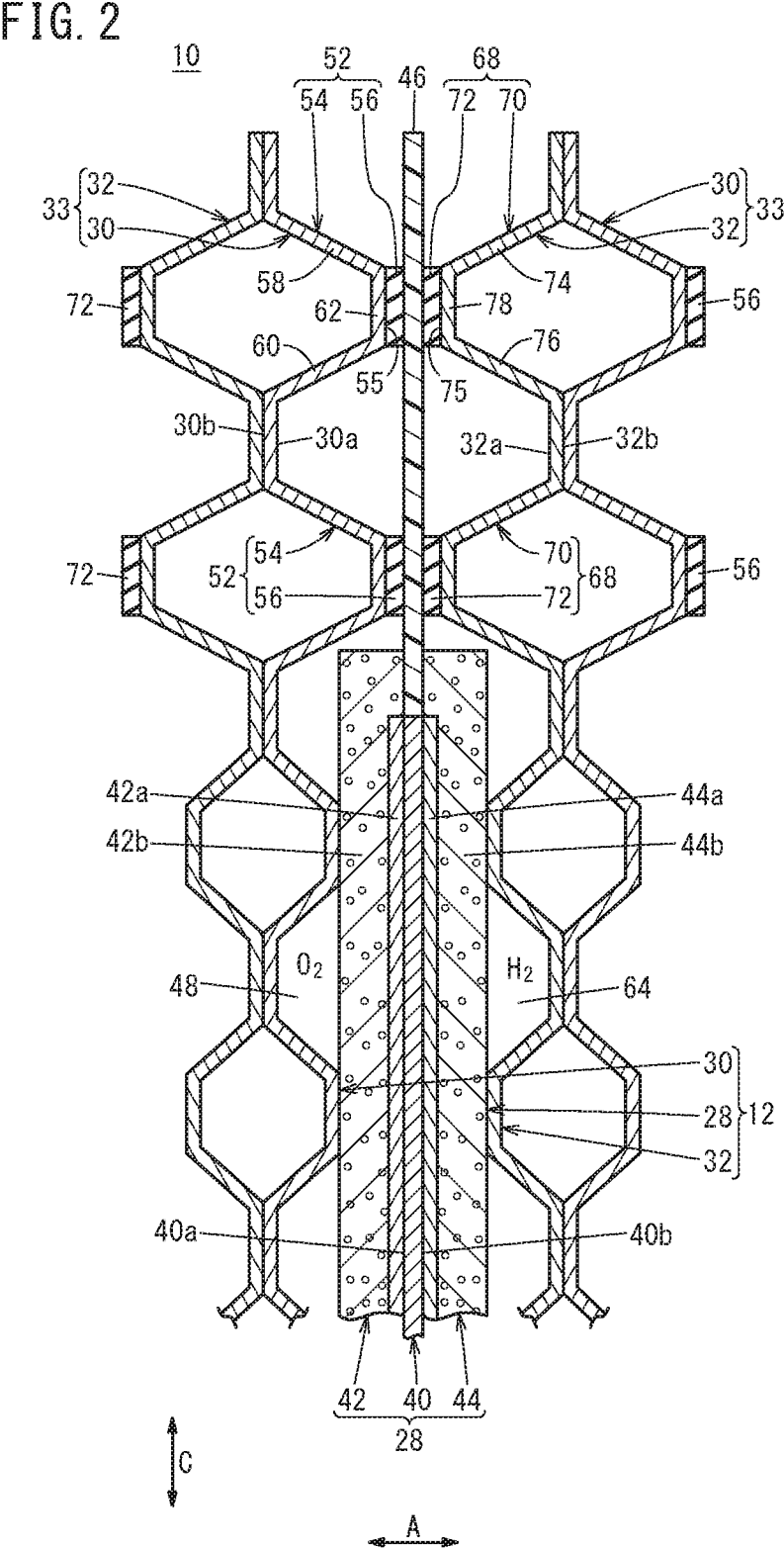
FIG. 2 is a vertical cross sectional view with partial omission, showing a power generation cell of the fuel cell stack.

As shown in FIGS. 1 and 2, a fuel cell stack 10 according to the present invention includes a stack body 14 formed by stacking a plurality of power generation cells 12 in a horizontal direction (indicated by an arrow A). It should be noted that the plurality of power generation cells 12 may be stacked in the gravity direction (indicated by an arrow C) to form the stack body 14. For example, the fuel cell stack 10 is mounted in a fuel cell vehicle such as a fuel cell electric automobile (not shown).

In FIG. 1, at one end of the stack body 14 in the stacking direction (indicated by the arrow A), a terminal plate 16a is provided. An insulator 18a is provided outside the terminal plate 16a. An end plate 20a is provided outside the insulator 18a. At the other end of the stack body 14 in the stacking direction, a terminal plate 16b is provided. An insulator 18b is provided outside the terminal plate 16b. An end plate 20b is provided outside the insulator 18b. Terminal units 22a, 22b are provided in the terminal plates 16a, 16b. The terminal units 22a, 22b extend outward in the stacking direction.

As shown in FIG. 1, each of the end plates 20a, 20b has a laterally elongated (or longitudinally elongated) rectangular shape, and coupling bars 24 are disposed between the sides of the end plates 20a, 20b. Both ends of each of the coupling bars 24 are fixed to inner surfaces of the end plates 20a, 20b using bolts 26, to apply a tightening load in the stacking direction (indicated by the arrow A) to the plurality of power generation cells 12 that are stacked together. It should be noted that the fuel cell stack 10 may include a casing including the end plates 20a, 20b, and the stack body 14 may be placed in the casing.

Figure 3:
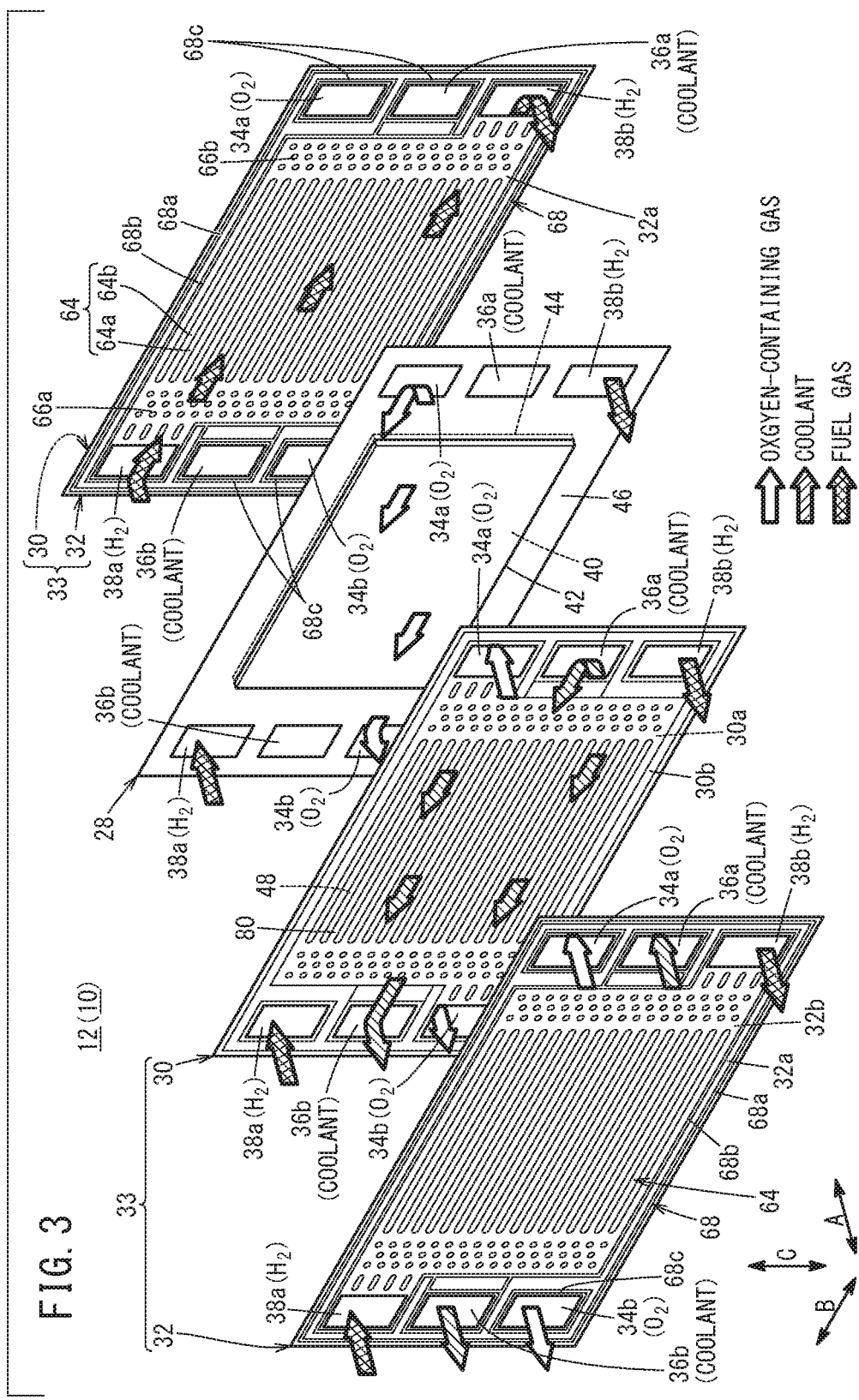
FIG. 3 is an exploded perspective view showing the power generation cell.

As shown in FIGS. 2 and 3, the power generation cell 12 includes a membrane electrode assembly (hereinafter also referred to as a "MEA 28"), and a first metal separator 30 and a second metal separator 32 sandwiching the membrane electrode assembly 28. Each of the first metal separator 30 and the second metal separator 32 is formed by press forming of a metal thin plate to have a corrugated shape in cross section and a wavy shape on the surface. For example, the metal thin plate is a steel plate, a stainless steel plate, an aluminum plate, a plated steel plate, or a metal plate having an anti-corrosive surface by surface treatment. Outer peripheries of the first metal separator 30 and the second metal separator 32 are joined together by welding, brazing, crimping, etc. to form a joint separator 33.

In FIG. 3, at one end of the power generation cell 12 in a long side direction indicated by an arrow B (horizontal direction), an oxygen-containing gas supply passage 34a, a coolant supply passage 36a, and a fuel gas discharge passage 38b are arranged in a direction indicated by an arrow C. The oxygen-containing gas supply passage 34a extends through the power generation cells 12 in the stacking direction (indicated by the arrow A), and an oxygen-containing gas is supplied through the oxygen-containing gas supply passage 34a. The coolant supply passage 36a extends through the power generation cells 12 in the stacking direction, and a coolant such as pure water ethylene glycol, or oil is supplied through the coolant supply passage 36a. The fuel gas discharge passage 38b extends through the power generation cells 12 in the stacking direction, and a fuel gas such as a hydrogen-containing gas is discharged through the fuel gas discharge passage 38b.

At the other end of the power generation cell 12 in the direction indicated by the arrow B, a fuel gas supply passage 38a, a coolant discharge passage 36b, and an oxygen-containing gas discharge passage 34b are arranged in the direction indicated by the arrow C. The fuel gas supply passage 38a extends through the power generation cells 12 in the stacking direction, and the fuel gas is supplied through the fuel gas supply passage 38a. The coolant discharge passage 36b extends through the power generation cells 12 in the stacking direction, and the coolant is discharged through the coolant discharger passage 36b. The oxygen-containing gas discharge passage 34b extends through the power generation cells 12 in the stacking direction, and the oxygen-containing gas is discharged through the oxygen-containing gas discharge passage 34b.

The layout, the shapes, and the sizes of the oxygen-containing gas supply passage 34a, the oxygen-containing gas discharge passage 34b, the fuel gas supply passage 38a, and the fuel gas discharge passage 38b are not limited to the illustrated embodiment, and may be determined as necessary depending on the required specification.

As shown in FIGS. 2 and 3, the MEA 28 includes an electrolyte membrane 40, a cathode 42 and an anode 44 provided on both sides of the electrolyte membrane 40, and a resin film 46 (resin frame member, frame member) provided along the outer periphery of the electrolyte membrane 40. For example, the electrolyte membrane 40 is a solid polymer electrolyte membrane (cation ion exchange membrane) which is a thin membrane of perfluorosulfonic acid containing water. A fluorine based electrolyte may be used as the electrolyte membrane 40. Alternatively, an HC (hydrocarbon) based electrolyte may be used as the electrolyte membrane 40. The surface size (outer size) of the electrolyte membrane 40 is smaller than the surface sizes (outer sizes) of the cathode 42 and the anode 44. The electrolyte membrane 40 includes a portion overlapped with outer peripheral portions of the cathode 42 and the anode 44.

The cathode 42 includes a first electrode catalyst layer 42a joined to one surface 40a of the electrolyte membrane 40, and a first gas diffusion layer 42b stacked on the first electrode catalyst layer 42a. The outer size of the first electrode catalyst layer 42a is smaller than the outer size of the first gas diffusion layer 42b, and the same as (or smaller than) the electrolyte membrane 40. It should be noted that the outer size of the first electrode catalyst layer 42a may be the same as the outer size of the first gas diffusion layer 42b.

The anode 44 includes a second electrode catalyst layer 44a joined to a surface 40b of the electrolyte membrane 40, and a second gas diffusion layer 44b stacked on the second electrode catalyst layer 44a. The outer size of the second electrode catalyst layer 44a is smaller than the outer size of the second gas diffusion layer 44b, and the same as (or smaller than) the outer size of the electrolyte membrane 40. It should be noted that the outer size of the second electrode catalyst layer 44a may be the same as the outer size of the second gas diffusion layer 44b.

For example, the first electrode catalyst layer 42a is formed by depositing porous carbon particles uniformly on the surface of the first gas diffusion layer 42b, and platinum alloy is supported on surfaces of the carbon particles. The second electrode catalyst layer 44a is formed by depositing porous carbon particles uniformly on the surface of the second gas diffusion layer 44b, and platinum alloy is supported on surfaces of the carbon particles. Each of the first gas diffusion layer 42b and the second gas diffusion layer 44b comprises a carbon paper, a carbon cloth, etc.

The resin film 46 having a frame shape is held between an outer marginal portion of the first gas diffusion layer 42b and an outer marginal portion of the second gas diffusion layer 44b. An inner end surface of the resin film 46 is positioned close to, or contacts an outer end surface of the electrolyte membrane 40. As shown in FIG. 3, at one end of the resin film 46 in the direction indicated by the arrow B, the oxygen-containing gas supply passage 34a, the coolant supply passage 36a, and the fuel gas discharge passage 38b are provided. At the other end of the resin film 46 in the direction indicated by the arrow B, the fuel gas supply passage 38a, the coolant discharge passage 36b, and the oxygen-containing gas discharge passage 34b are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the solid polymer electrolyte membrane 40 may protrude outward without using the resin film 46. Further, frame shaped films may be provided on both sides of the solid polymer electrolyte membrane 40 which protrudes outward.

Figure 4:
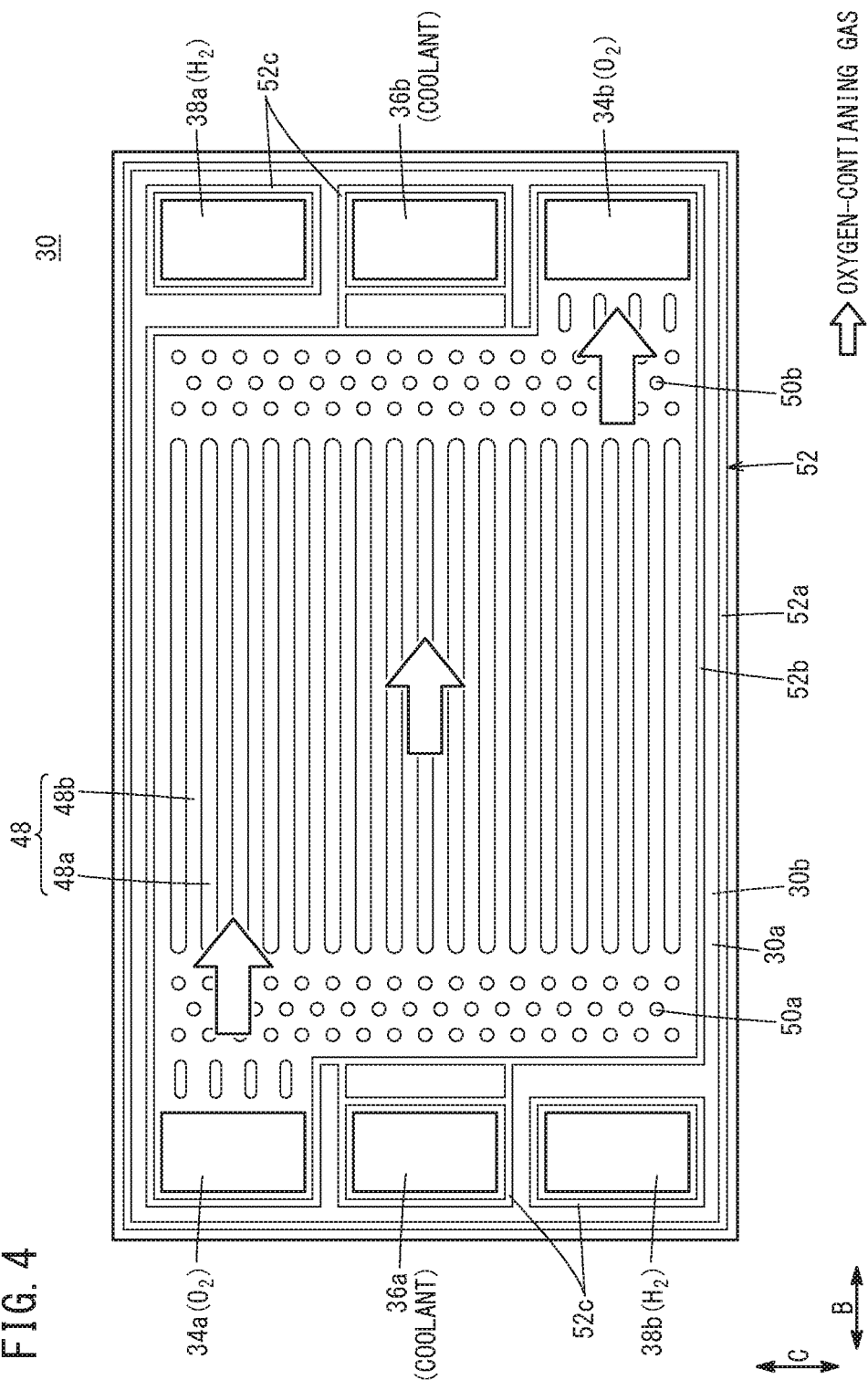
FIG. 4 is a front view showing a first metal separator of the power generation cell.

As shown in FIG. 4, the first metal separator 30 has, on its surface 30a facing the MEA 28, an oxygen-containing gas flow field 48 extending, for example, in the direction indicated by the arrow B. The oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b (or wavy flow grooves) between a plurality of ridges 48a extending straight in the direction indicated by the arrow B.

An inlet buffer 50a having a plurality of bosses is provided between the oxygen-containing gas supply passage 34a and the oxygen-containing gas flow field 48. An outlet buffer 50b having a plurality of bosses is provided between the oxygen-containing gas discharge passage 34b and the oxygen-containing gas flow field 48.

A first seal line 52 is provided on the surface 30a of the first metal separator 30, for preventing leakage of fluid (the oxygen-containing gas, the fuel gas, and the coolant) from a portion between the MEA 28 and the first metal separator 30 to the outside.

The first seal line 52 includes an outer seal 52a provided around an outer marginal portion of the surface 30a of the first metal separator 30. The first seal line 52 includes an inner seal 52b formed around the oxygen-containing gas flow field 48, the oxygen-containing gas supply passage 34a, and the oxygen-containing gas discharge passage 34b while allowing the oxygen-containing gas flow field 48 to be connected to the oxygen-containing gas supply passage 34a and the oxygen-containing gas discharge passage 34b. Further, the first seal line 52 includes passage seals 52c formed around the fuel gas supply passage 38a, the fuel gas discharge passage 38b, the coolant supply passage 36a, and the coolant discharge passage 36b. The outer seal 52a may be provided as necessary, and may be dispensed with.

As shown in FIG. 2, the first seal line 52 includes a first seal bead 54 protruding from the surface 30a of the first metal separator 30 in the stacking direction (toward the resin film 46 of the MEA 28), and a first rubber seal member 56 provided on the first seal bead 54.

The first seal bead 54 is formed on the surface 30a of the first metal separator 30 by press forming so as to be expanded from the surface 30a. The first seal bead 54 has a tapered shape. Stated otherwise, the first seal bead 54 has a trapezoidal shape.

The first seal bead 54 includes a first side wall 58 and a second side wall 60 provided to face each other, and a top part 62 coupling front ends of the first side wall 58 and the second side wall 60 together. The distance between the first side wall 58 and the second side wall 60 is decreased gradually toward the top part 62. The top part 62 is formed to have a flat shape in the state where a load in the stacking direction is applied to the stack body 14. That is, a protruding end surface 55 of the first seal bead 54 is a flat surface extending in a direction perpendicular to the stacking direction.

Examples of material used for the first rubber seal member 56 include an EPDM (ethylene propylene diene methylene rubber), an NBR (nitrile butadiene rubber), a fluoro rubber, a silicone rubber, a fluorosilicone rubber, a butyl rubber, a natural rubber, a styrene rubber, a chloroprene rubber, an acrylic rubber, and porous bodies of these rubbers. The first rubber seal member 56 is fixed to the top part 62 (protruding end surface 55) of the first seal bead 54. That is, the first rubber seal member 56 is interposed between the top part 62 of the first seal bead 54 and the resin film 46. The first rubber seal member 56 may be fixed to the resin film 46.

As shown in FIG. 3, the second metal separator 32 has, on its surface 32a facing the MEA 28, a fuel gas flow field 64 extending, for example, in the direction indicated by the arrow B. The fuel gas flow field 64 is connected to (in fluid communication with) the fuel gas supply passage 38a and the fuel gas discharge passage 38b. The fuel gas flow field 64 includes straight flow grooves 64b (or wavy flow grooves) between a plurality of ridges 64a extending in the direction indicated by the arrow B.

An inlet buffer 66a having a plurality of bosses is provided between the fuel gas supply passage 38a and the fuel gas flow field 64. An outlet buffer 66b having a plurality of bosses is provided between the fuel gas discharge passage 38b and the fuel gas flow field 64.

A second seal line 68 is provided on the surface 32a of the second metal separator 32, for preventing leakage of fluid (the oxygen-containing gas, the fuel gas, and the coolant) from a portion between the MEA 28 and the second metal separator 32 to the outside.

The second seal line 68 includes an outer seal 68a provided around an outer marginal portion of the surface 32a of the second metal separator 32. The second seal line 68 includes an inner seal 68b formed around the fuel gas flow field 64, the fuel gas supply passage 38a, and the fuel gas discharge passage 38b while allowing the fuel gas flow field 64 to be connected to the fuel gas supply passage 38a and the fuel gas discharge passage 38b. Further, the second seal line 68 includes passage seals 68c formed around the oxygen-containing gas supply passage 34a, the oxygen-containing gas discharge passage 34b, the coolant supply passage 36a, and the coolant discharge passage 36b. The outer seal 68a may be provided as necessary, and may be dispensed with.

As shown in FIG. 2, the second seal line 68 includes a second seal bead 70 protruding from the surface 32a of the second metal separator 32 in the stacking direction (toward the resin film 46 of the MEA 28), and a second rubber seal member 72 provided on the second seal bead 70.

The second seal bead 70 is formed on the surface 32a of the second metal separator 32 by press forming so as to be expanded from the surface 32a. The second seal bead 70 has a tapered shape. Stated otherwise, the second seal bead 70 has a trapezoidal shape.

The second seal bead 70 includes a first side wall 74 and a second side wall 76 provided to face each other, and a top part 78 coupling front ends of the first side wall 74 and the second side wall 76 together. The distance between the first side wall 74 and the second side wall 76 is decreased gradually toward the top part 78. The top part 78 is formed to have a flat shape in the state where the tightening load in the stacking direction is applied to the stack body 14. That is, a protruding end surface 75 of the second seal bead 70 is a flat surface extending in a direction perpendicular to the stacking direction.

The material used for the second rubber seal member 72 is the same as the material used for the first rubber seal member 56. The second rubber seal member 72 is fixed to the top part 78 (protruding end surface 75) of the second seal bead 70. That is, the second rubber seal member 72 is interposed between the top part 78 of the second seal bead 70 and the resin film 46. The second rubber seal member 72 may be fixed to the resin film 46.

In FIG. 3, a coolant flow field 80 is formed between a surface 30b of the first metal separator 30 and a surface 32b of the second metal separator 32 that are joined together. The coolant flow field 80 is connected to (in fluid communication with) the coolant supply passage 36a and the coolant discharge passage 36b. When the first metal separator 30 and the second metal separator 32 are stacked together, the coolant flow field 80 is formed on the back surface of the oxygen-containing gas flow field 48 formed on the first metal separator 30 and the back surface of the fuel gas flow field 64 formed on the second metal separator 32.

Next, the first seal line 52 and the second seal line 68 in the fuel cell stack 10 as described above will be described in relation to the method of producing the fuel cell stack 10.

In the case of producing the fuel cell stack 10, the following steps are performed: a preparing step of preparing a plurality of power generation cells 12; and a tightening step of applying a tightening load in a stacking direction to the power generation cells 12 that are stacked together, to deform the first seal bead 54, the first rubber seal member 56, the second seal bead 70, and the second rubber seal member 72 in the stacking direction.

Figure 5A:
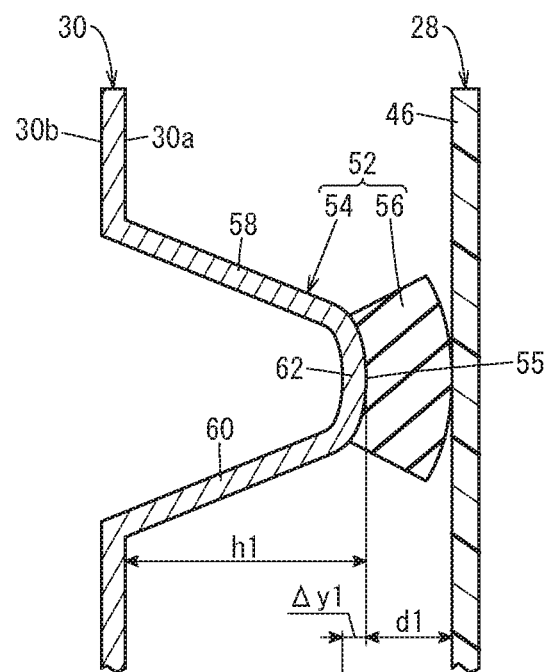
FIG. 5A is a view showing a first seal line before applying a tightening load in a stacking direction to a stack body of the fuel cell stack.
Figure 6A:
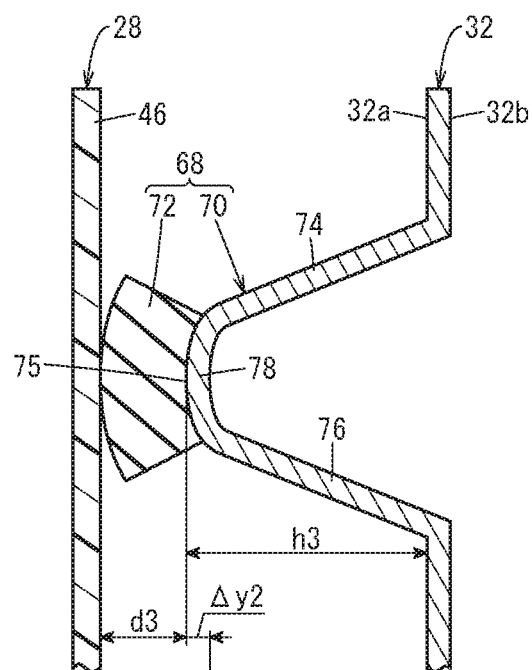
FIG. 6A is a view showing a second seal line before applying the tightening load in the stacking direction to the stack body.

As shown in FIG. 5A, in the state before the tightening load is applied to the stack body 14 (in the preparing step before applying the tightening load), the top part 62 of the first seal bead 54 protrudes in a circular arc shape toward the resin film 46. That is, before applying the tightening load, the protruding end surface 55 of the first seal bead 54 is a ridge shaped curved surface. Further, as shown in FIG. 6A, before applying the tightening load (in the preparing step), the top part 78 of the second seal bead 70 protrudes in a circular arc shape toward the resin film 46. That is, before applying the tightening load, the protruding end surface 75 of the second seal bead 70 is a ridge shaped curved surface. It should be noted that FIGS. 5A and 6A show structure where the first rubber seal member 56 is provided for the first seal bead 54, and the second rubber seal member 72 is provided for the second seal bead 70. On the other hand, in the case where the first rubber seal member 56 and the second rubber seal member 72 are provided for the resin film 46, the resulting shapes of the first rubber seal member 56 and the second rubber seal member 72 are different from the shapes thereof shown in FIGS. 5A and 6A.

Figure 5B:
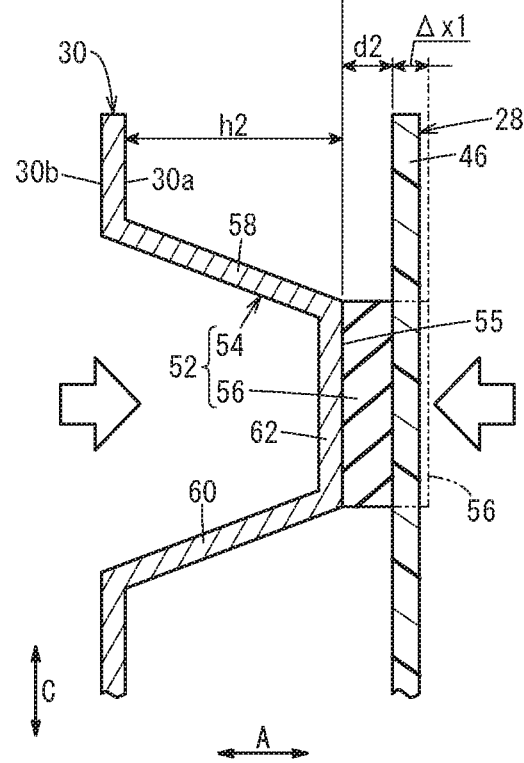
FIG. 5B is a view showing deformation of the first seal line in a state where the tightening load in the stacking direction is applied to the stack body of the fuel cell stack.
Figure 6B:
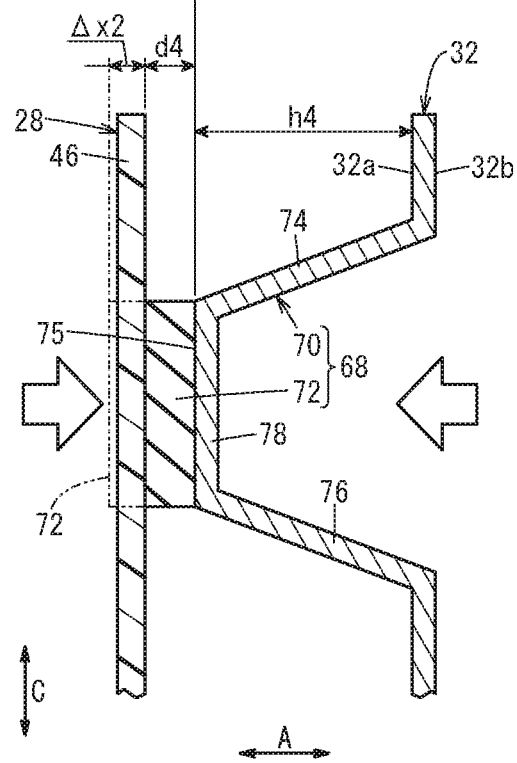
FIG. 6B is a view showing deformation of the second seal line in a state where the tightening load in the stacking direction is applied to the stack body of the fuel cell stack.

In the tightening step, when the tightening load in the stacking direction is applied to the stack body 14, the top part 62 of the first seal bead 54 is pressed in a direction opposite to the resin film 46 and deformed to have a flat shape (see FIG. 5B), and the top part 78 of the second seal bead 70 is pressed in a direction opposite to the resin film 46 and deformed to have a flat shape (see FIG. 6B). Further, at this time, each of the first rubber seal member 56 and the second rubber seal member 72 is deformed elastically (deformed by compression) in the stacking direction (see FIGS. 5A to 6B).

That is, in FIGS. 5B and 6B, in the state where the tightening load is applied to the stack body 14, each of the top part 62 of the first seal bead 54 and the top part 78 of the second seal bead 70 is formed to have a flat shape. Stated otherwise, each of the protruding end surface 55 of the first seal bead 54 and the protruding end surface 75 of the second seal bead 70 is formed to have a flat shape extending in a direction perpendicular to the stacking direction.

In FIGS. 5A and 5B, a first thickness d1, in the stacking direction, of the first rubber seal member 56 before applying the tightening load (the first rubber seal member 56 forming the power generation cell 12 prepared in the preparing step) is set such that, when the tightening load is applied to the stack body 14 (when the tightening step is performed), a first amount of deformation $\Delta x1$ of the first rubber seal member 56 in the stacking direction is larger than a second amount of deformation $\Delta y1$ of the first seal bead 54 in the stacking direction.

The first amount of deformation $\Delta x1$ of the first rubber seal member 56 is the amount calculated by subtracting a second thickness d2 of the first rubber seal member 56 in the stacking direction in the state where the tightening load is applied, from the first thickness d1 of the first rubber seal member 56 ($\Delta x1 = d1 - d2$). The second amount of deformation $\Delta y1$ of the first seal bead 54 is the amount calculated by subtracting a second height h2 of the first seal bead 54 in the state where the tightening load is applied, from a first height h1 of the first seal bead 54 before the tightening load is applied ($\Delta y1 = h1 - h2$).

The first height h1 is the distance from the surface 30a of the first metal separator 30 to the protruding end of the first seal bead 54 (part of the protruding end surface 55 that protrudes most toward the resin film 46) before the tightening load is applied. The second height h2 is the distance from the surface 30a of the first metal separator 30 to the protruding end surface 55 of the first seal bead 54 in the state where the tightening load is applied. The first thickness d1 is smaller than the second height h2. It should be noted that the first thickness d1 may be the second height h2 or more.

In FIGS. 6A and 6B, a third thickness d3, in the stacking direction, of the second rubber seal member 72 before applying the tightening load (the second rubber seal member 72 forming the power generation cell 12 prepared in the preparing step) is set such that, when the tightening load is applied to the stack body 14 (when the tightening step is performed), a third amount of deformation $\Delta x2$ of the second rubber seal member 72 in the stacking direction is larger than a fourth amount of deformation $\Delta y2$ of the second seal bead 70 in the stacking direction.

The third amount of deformation $\Delta x2$ of the second rubber seal member 72 is the amount calculated by subtracting a fourth thickness d4 of the second rubber seal member 72 in the stacking direction in the state where the tightening load is applied, from the third thickness d3 of the second rubber seal member 72 ($\Delta x2=d3-d4$). The fourth amount of deformation $\Delta y2$ of the second seal bead 70 is the amount calculated by subtracting a fourth height h4 of the second seal bead 70 in the state where the tightening load is applied, from the third height h3 of the second seal bead 70 before the tightening load is applied ($\Delta y2=h3-h4$).

The third height h3 is the distance from the surface 32a of the second metal separator 32 to the protruding end of the second seal bead 70 (part of the protruding end surface 75 that protrudes most toward the resin film 46) before the tightening load is applied. The fourth height h4 is the distance from the surface 32a of the second metal separator 32 to the protruding end surface 75 of the second seal bead 70 in the state where the tightening load is applied. The third thickness d3 is smaller than the fourth height h4. It should be noted that the third thickness d3 may be the fourth height h4 or more.

FIG. 7 is a graph showing the relationship between the thickness of the first rubber seal member 56 (second rubber seal member 72) before the tightening load is applied (when the tightening load is not applied) and the amount of deformation of the first rubber seal member 56 (second rubber seal member 72) when a constant tightening load is applied. As can be seen from FIG. 7, as the thickness of the first rubber seal member 56 (second rubber seal member 72) increases, the amount of deformation for the constant tightening load increases. As shown in FIG. 7, in the case where the thickness of the first rubber seal member 56 in the stacking direction before the tightening load is applied is da, the amount of deformation of the first rubber seal member 56 when the tightening load is applied is the same as the second amount of deformation $\Delta y1$ of the first seal bead 54. Therefore, the first thickness d1 of the first rubber seal member 56 in the stacking direction before applying the tightening load is set to be larger than da. Preferably, the first thickness d1 is not less than 40 µm and not more than 150 µm.

In the case where the thickness of the second rubber seal member 72 in the stacking direction before the tightening load is applied is db, the amount of deformation of the second rubber seal member 72 when the tightening load is applied is the same as the fourth amount of deformation $\Delta y2$ of the second seal bead 70. Therefore, the third thickness d3 of the second rubber seal member 72 in the stacking direction before applying the tightening load is set to be larger than db. Preferably, the third thickness d3 is not less than 40 µm and not more than 150 µm. Further, preferably, the third thickness d3 and the first thickness d1 are the same.

Operation of the fuel cell stack 10 having the above structure will be described below.

Firstly, as shown in FIG. 1, an oxygen-containing gas such as the air is supplied to the oxygen-containing gas supply passage 34a of the end plate 20a. The fuel gas such as the hydrogen-containing gas is supplied to the fuel gas supply passage 38a of the end plate 20a. A coolant such as pure water, ethylene glycol, or oil is supplied to the coolant supply passage 36a of the end plate 20a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 42 of the MEA 28.

In the meanwhile, the fuel gas flows from the fuel gas supply passage 38a into the fuel gas flow field 64 of the second metal separator 32. The fuel gas flows along the fuel gas flow field 64 in the direction indicated by the arrow B, and the fuel gas is supplied to the anode 44 of the MEA 28.

Thus, in each of the MEAs 28, the oxygen-containing gas supplied to the cathode 42 and the fuel gas supplied to the anode 44 are partially consumed in the electrochemical reactions in the first electrode catalyst layer 42a and the second electrode catalyst layer 44a to perform power generation.

Then, after the oxygen-containing gas supplied to the cathode 42 is partially consumed at the cathode 42, the oxygen-containing gas is discharged along the oxygen-containing gas discharge passage 34b in the direction indicated by the arrow A. Likewise, after the fuel gas supplied to the anode 44 is partially consumed at the anode 44, the fuel gas is discharged along the fuel gas discharge passage 38b in the direction indicated by the arrow A.

Further, the coolant supplied to the coolant supply passage 36a flows into the coolant flow field 80 formed between the first metal separator 30 and the second metal separator 32, and thereafter, the coolant flows in the direction indicated by the arrow B. After the coolant cools the MEA 28, the coolant is discharged from the coolant discharge passage 36b.

In this case, the fuel cell stack 10 and the method of producing the fuel cell stack 10 according to the embodiment of the present invention offer the following advantages.

The first thickness d1, in the stacking direction, of the first rubber seal member 56 before the tightening load is applied to the stack body 14 (the first rubber seal member 56 forming the power generation cell 12 prepared in the preparing step) is set such that, when the tightening load is applied to the stack body 14 (when the tightening step is performed), the first amount of deformation $\Delta x1$ of the first rubber seal member 56 in the stacking direction is larger than the second amount of deformation $\Delta y1$ of the first seal bead 54 in the stacking direction.

In the structure, when the tightening load is applied to the stack body 14, even if the top part 62 of the first seal bead 54 is pressed in a direction opposite to the first rubber seal member 56 and deformed, deformation of the first seal bead 54 is compensated by deformation of the first rubber seal member 56. Accordingly, it is possible to prevent formation of a gap on a seal surface of the first rubber seal member 56. Therefore, it is possible to apply the sufficient surface pressure to the seal surface of the first rubber seal member 56, and achieve the desired sealing performance of the first seal line 52.

Further, the third thickness d3, in the stacking direction, of the second rubber seal member 72 before the tightening load is applied to the stack body 14 (the second rubber seal member 72 forming the power generation cell 12 prepared in the preparing step) is set such that, when the tightening load is applied to the stack body 14 (when the tightening step is performed), the third amount of deformation Δx2 of the second rubber seal member 72 in the stacking direction is larger than the fourth amount of deformation Δy2 of the second seal bead 70 in the stacking direction.

In the structure, when the tightening load is applied to the stack body 14, even if the top part 78 of the second seal bead 70 is pressed in a direction opposite to the second rubber seal member 72 and deformed, deformation of the second seal bead 70 is compensated by deformation of the second rubber seal member 72. Accordingly, it is possible to prevent formation of a gap on a seal surface of the second rubber seal member 72. Therefore, it is possible to apply the sufficient surface pressure to the seal surface of the second rubber seal member 72, and achieve the desired sealing performance of the second seal line 68.

In the state where the tightening load is applied to the stack body 14, the top part 62 of the first seal bead 54 and the top part 78 of the second seal bead 70 have a flat shape.

Accordingly, it is possible to effectively apply the sufficient surface pressure to the seal surfaces of the first rubber seal member 56 and the second rubber seal member 72.

Figure 8:
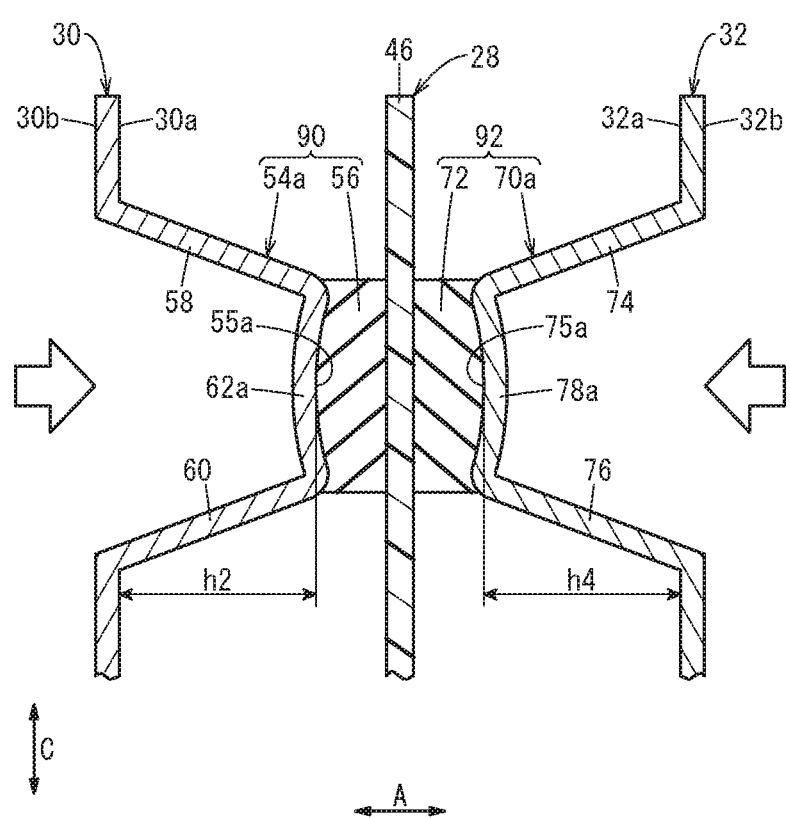
FIG. 8 is a cross sectional view showing a first seal line and a second seal line according to a modified embodiment.

The present invention is not limited to the above structure. As shown in FIG. 8, a first seal line 90 may be provided on the surface 30a of the first metal separator 30. The first seal line 90 includes a first seal bead 54a and a first rubber seal member 56. A top part 62a of the first seal bead 54a is curved to be recessed (buckled) in a direction opposite to the first rubber seal member 56. That is, a protruding end surface 55a of the first seal bead 54a is a curved surface in the form of a recess.

The first thickness d1, in the stacking direction, of the first rubber seal member 56 before the tightening load is applied (the first rubber seal member 56 forming the power generation cell 12 prepared in the preparing step) is set such that, when the tightening load is applied to the stack body 14 (when the tightening step is performed), the first amount of deformation Δx1 of the first rubber seal member 56 in the stacking direction is larger than the second amount of deformation Δy1 of the first seal bead 54a in the stacking direction.

In this case, the second height h2 of the first seal bead 54a in the state where the tightening load is applied is the distance from the surface 30a of the first metal separator 30 to the bottom of the protruding end surface 55a of the first seal bead 54a (part of the protruding end surface 55a that is depressed most in a direction opposite to the resin film 46).

As described above, even if the top part 62a of the first seal bead 54a is curved to be recessed at the time of performing the tightening step, deformation of the first seal bead 54a is compensated by deformation of the first rubber seal member 56. Accordingly, it is possible to prevent formation of a gap on a seal surface of the first rubber seal member 56. Therefore, it is possible to apply the sufficient surface pressure to the seal surface of the first rubber seal member 56, and achieve the desired sealing performance of the first seal line 90.

Further, a second seal line 92 may be provided on the surface 32a of the second metal separator 32. The second seal line 92 includes a second seal bead 70a and a second rubber seal member 72. A top part 78a of the second seal bead 70a is curved to be recessed (buckled) in a direction opposite to the second rubber seal member 72. That is, a protruding end surface 75a of the second seal bead 70a is a curved surface in the form of a recess.

The third thickness d3, in the stacking direction, of the second rubber seal member 72 before the tightening load is applied (the second rubber seal member 72 forming the power generation cell 12 prepared in the preparing step) is set such that, when the tightening load is applied to the stack body 14 (when the tightening step is performed), the third amount of deformation Δx2 of the second rubber seal member 72 in the stacking direction is larger than the fourth amount of deformation Δy2 of the second seal bead 70a in the stacking direction.

In this case, the fourth height h4 of the second seal bead 70a before the tightening load is applied is the distance from the surface 32a of the second metal separator 32 to the bottom of the protruding end surface 75a of the second seal bead 70a (part of the protruding end surface 75a that is depressed most in a direction opposite to the resin film 46).

As described above, even if the top part 78a of the second seal bead 70a is curved to be recessed at the time of performing the tightening step, deformation of the second seal bead 70a is compensated by deformation of the second rubber seal member 72. Accordingly, it is possible to prevent formation of a gap on a seal surface of the second rubber seal member 72. Therefore, it is possible to apply the sufficient surface pressure to the seal surface of the second rubber seal member 72, and achieve the desired sealing performance of the second seal line 92.

The present invention is not limited to the above described embodiments. Various modifications may be made without departing from the gist of the present invention.

The above embodiments are summarized as follows.

The above embodiments disclose the fuel cell stack (10) including the stack body (14) formed by stacking the plurality of power generation cells (12) in the stacking direction, the power generation cells (12) each including the membrane electrode assembly (28) and the metal separators (30, 32) provided on both sides of the membrane electrode assembly (28), the membrane electrode assembly (28) including the electrolyte membrane (40) and the electrodes (42, 44) provided on both sides of the electrolyte membrane (40), the tightening load being applied to the stack body (14) in the stacking direction of the stack body (14), and the metal separator (30, 32) being provided with the seal line (52, 68, 90, 92) configured to prevent leakage of fluid from a portion between the membrane electrode assembly (28) and the metal separator (30, 32) to the outside, wherein the seal line (52, 68, 90, 92) includes the seal bead (54, 54a, 70, 70a) protruding from a surface (30a, 32a) of the metal separator (30, 32) on the side where the membrane electrode assembly (28) is positioned, and the rubber seal member (56, 72) interposed between the top part (62, 62a, 78, 78a) of the seal bead (54, 54a, 70, 70a) and the frame (46) provided in the outer peripheral portion of the electrolyte membrane (40) or provided along the outer periphery of the electrolyte membrane (40), and the thickness (d1, d3) of the rubber seal member (56, 72) in the stacking direction before the tightening load is applied to the stack body (14) is set such that, when the tightening load is applied to the stack body (14), the amount of deformation (Δx1, Δx2) of the rubber seal member (56, 72) in the stacking direction is larger than the amount of deformation (Δy1, Δy2) of the seal bead (54, 54a, 70, 70a) in the stacking direction.

In the above fuel cell stack (10), the top part (62, 78) of the seal bead (54, 70) may be formed to have a flat shape in a state where the tightening load is applied to the stack body (14).

In the above fuel cell stack (10), the top part (62a, 78a) of the seal bead (54a, 70a) may be curved to be recessed in a direction opposite to the rubber seal member (56, 72) in a state where the tightening load is applied to the stack body (14).

In the above fuel cell stack, the thickness of the rubber seal member in the stacking direction before the tightening load is applied to the stack body may be smaller than the height (h2, h4) of the seal bead in the stacking direction when the tightening load is applied to the stack body.

In the above fuel cell stack, the seal bead may be tapered toward the top part to have a trapezoidal shape.

In the fuel cell stack, the rubber seal member may be fixed to the top part.

The above embodiments disclose the method of producing the fuel cell stack (10) including the stack body (14) formed by stacking the plurality of power generation cells (12) in the stacking direction, the power generation cells (12) each including the membrane electrode assembly (28) and the metal separators (30, 32) provided on both sides of the membrane electrode assembly (28), the membrane electrode assembly (28) including the electrolyte membrane (40) and the electrodes (42, 44) provided on both sides of the electrolyte membrane (40), the metal separator (30, 32) being provided with the seal line (52, 68, 90, 92) configured to prevent leakage of fluid from a portion between the membrane electrode assembly (28) and the metal separator (30, 32) to the outside, and the seal line (52, 68, 90, 92) including the seal bead (54, 54a, 70, 70a) protruding from a surface (30a, 32a) of the metal separator (30, 32) on the side where the membrane electrode assembly (28) is positioned, and the rubber seal member (56, 72) interposed between the top part (62, 62a, 78, 78a) of the seal bead (54, 54a, 70, 70a) and the frame (46) provided in the outer peripheral portion of the electrolyte membrane (40) or provided along the outer periphery of the electrolyte membrane (40), the method including the steps of preparing the plurality of power generation cells (12), and applying the tightening load to the power generation cells (12) in the stacking direction in the state where the plurality of power generation cells (12) are stacked together, to deform the seal bead (54, 54a, 70, 70a) and the rubber seal member (56, 72) in the stacking direction, wherein the thickness (d1, d3), in the stacking direction, of the rubber seal member (56, 72) forming the power generation cell (12) prepared in the preparing step is set such that, when the tightening step is performed, the amount of deformation ($\Delta x1$, $\Delta x2$) of the rubber seal member (56, 72) in the stacking direction is larger than the amount of deformation ($\Delta y1$, $\Delta y2$) of the seal bead (54, 54a, 70, 70a) in the stacking direction.

What is claimed is:

1. A fuel cell stack comprising:
a stack body comprising:
a plurality of power generation cells stacked in a stacking direction, the power generation cells each comprising a membrane electrode assembly and metal separators provided on both sides of the membrane electrode assembly, the membrane electrode assembly comprising an electrolyte membrane and electrodes provided on both sides of the electrolyte membrane,
a tightening load applied to the stack body in the stacking direction of the stack body, and
the metal separator provided with a seal line configured to prevent leakage of fluid from a portion between the membrane electrode assembly and the metal separator to outside, wherein
the seal line comprises:
a seal bead protruding from a surface of the metal separator on a side where the membrane electrode assembly is positioned; and
a rubber seal member interposed between a top part of the seal bead and a frame provided in an outer peripheral portion of the electrolyte membrane or provided along an outer periphery of the electrolyte membrane, wherein
the top part of the seal bead protrudes in a curved shape toward the membrane electrode assembly before the tightening load is applied to the stack body, and is deformed by being pressed in a direction opposite to the membrane electrode assembly when the tightening load is applied to the stack body,
the rubber seal member is deformed by compression when the tightening load is applied to the stack body, and
a thickness of the rubber seal member in the stacking direction before the tightening load is applied to the stack body is set such that, when the tightening load is applied to the stack body, an amount of deformation of the rubber seal member in the stacking direction is larger than an amount of deformation of the seal bead in the stacking direction.

2. The fuel cell stack according to claim 1, wherein the top part of the seal bead is formed to have a flat shape in a state where the tightening load is applied to the stack body.

3. The fuel cell stack according to claim 1, wherein the top part of the seal bead is curved to be recessed in a direction opposite to the rubber seal member in a state where the tightening load is applied to the stack body.

4. The fuel cell stack according to claim 1, wherein the thickness of the rubber seal member in the stacking direction before the tightening load is applied to the stack body is smaller than a height of the seal bead in the stacking direction when the tightening load is applied to the stack body.

5. The fuel cell stack according to claim 1, wherein the seal bead is tapered toward the top part to have a trapezoidal shape.

6. The fuel cell stack according to claim 1, wherein the rubber seal member is fixed to the top part.

7. A method of producing a fuel cell stack comprising a stack body comprising:
a plurality of power generation cells stacked in a stacking direction, the power generation cells each comprising a membrane electrode assembly and metal separators provided on both sides of the membrane electrode assembly, the membrane electrode assembly comprising an electrolyte membrane and electrodes provided on both sides of the electrolyte membrane,
the metal separator being provided with a seal line configured to prevent leakage of fluid from a portion between the membrane electrode assembly and the metal separator to outside, and
the seal line comprising:
a seal bead protruding from a surface of the metal separator on a side where the membrane electrode assembly is positioned; and
a rubber seal member interposed between a top part of the seal bead and a frame provided in an outer peripheral portion of the electrolyte membrane or provided along an outer periphery of the electrolyte membrane, the method comprising the steps of:
preparing the plurality of power generation cells; and
applying a tightening load to the power generation cells in the stacking direction in a state where the plurality of power generation cells are stacked together, to deform the seal bead and the rubber seal member in the stacking direction, wherein
the top part of the seal bead protrudes in a curved shape toward the membrane electrode assembly before the tightening load is applied to the stack body,
in the step of applying the tightening load to the power generation cells in the stacking direction, the top part of the seal bead is deformed by being pressed in a direction opposite to the membrane electrode assembly, and the rubber seal member is deformed by compression, and
a thickness, in the stacking direction, of the rubber seal member forming the power generation cell prepared in the preparing step is set such that, when the tightening step is performed, an amount of deformation of the rubber seal member in the stacking direction is larger than an amount of deformation of the seal bead in the stacking direction.

\* \* \* \* \*